July 9, 1935.  G. F. SHEARMAN  2,007,311
NAIL
Filed March 23, 1935
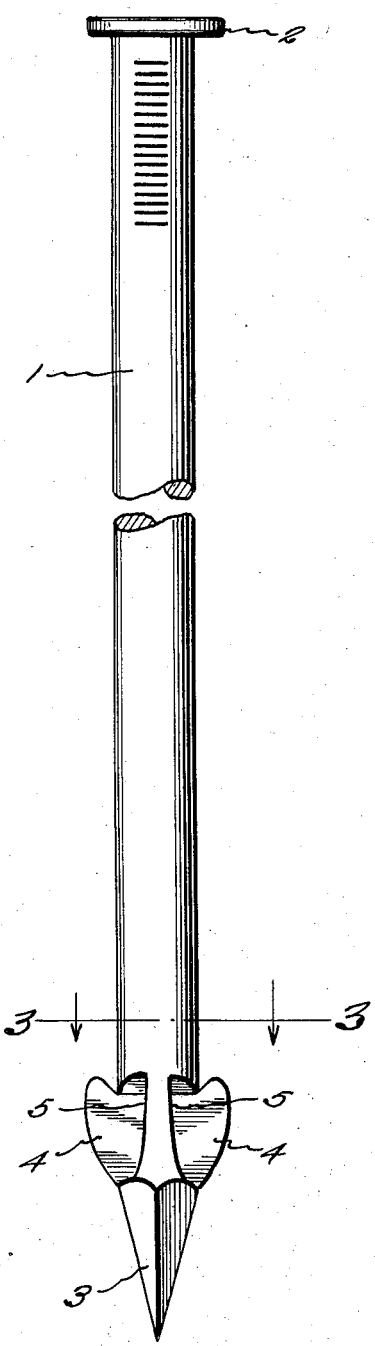
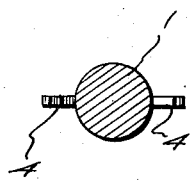
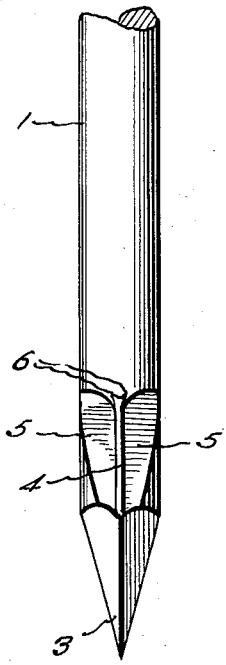
Inventor
George F. Shearman
By *Clarence A. O'Brien*
Attorney Patented July 9, 1935

2,007,311

UNITED STATES PATENT OFFICE 2,007,311

NAIL

George F. Shearman, Chicago, Ill.

Application March 23, 1935, Serial No. 12,687

1 Claim. (Cl. 85—30)

The present invention relates to new and useful improvements in nails, and has for one of its important objects to provide, in a manner as hereinafter set forth, novel means for anchoring the nail in the material into which it may be driven.

Another very important object of the invention is to provide a nail or similar fastening device comprising anchoring barbs struck from the body or shank of the nail in a manner to leave indentations, said indentations providing additional anchoring means.

Other objects of the invention are to provide a nail of the aforementioned character which will be comparatively simple in construction, strong, durable, and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:—

Figure 1 is a view in front elevation of a nail constructed in accordance with the present invention.

Figure 2 is a side elevational view thereof.

Figure 3 is a view in horizontal section, taken substantially on the line 3—3 of Figure 1.

Referring now to the drawing in detail, it will be seen that the reference numeral 1 designates the body or shank of the nail which is provided, on one end, with the usual head 2. At its other end, the shank 1 terminates in a point 3 comprising a plurality of flat, substantially triangular faces.

Projecting from opposite sides of the shank 1 immediately above the pointed end portion 3 are anchoring barbs 4 which are preferably of substantially the shape shown to advantage in Figure 1 of the drawing. The barbs 4 are struck from the body or shank 1 of the nail through the medium of suitable dies in a manner to leave indentations 5, said indentations providing additional anchoring means.

It will be noted that the anchoring barbs 4 terminate substantially in points at their upper ends. During the manufacture of the nail these points are swaged in a manner to provide comparatively small diverging anchoring prongs 6, as best seen in Figure 2 of the drawing.

The shape of the anchoring barbs 4 is such that the nail may be easily driven into the wood or other material. However, after the nail has been driven the barbs 4 will bite into the material in a manner to effectively prevent withdrawal of said nail. Also, the material will enter the indentations 5 in a manner to further secure the nail. Then, the spurs 6 provide means for still further retaining the nail in the material.

It is believed that the many advantages of a nail or similar fastening means constructed in accordance with the present invention will be readily understood, and although a preferred embodiment is as illustrated and described, it is to be understood that changes in the details of construction may be resorted to which will fall within the scope of the invention as claimed.

What is claimed is:—

A nail comprising a shank including a point on one end, anchoring barbs projecting from opposite sides of the shank adjacent the point, said shank having indentations therein on opposite sides of the anchoring barbs, and upwardly extending diverging anchoring spurs on the upper end of each of the barbs.

GEORGE F. SHEARMAN.